Aug. 29, 1967        P. L. EPSTEIN        3,339,193

TELEMETERING APPARATUS

Filed May 3, 1965        3 Sheets-Sheet 1

INVENTOR.
Philip L. Epstein
BY Morse, Altman & Oates
ATTORNEYS

Aug. 29, 1967   P. L. EPSTEIN   3,339,193
TELEMETERING APPARATUS
Filed May 6, 1965   3 Sheets-Sheet 2

INVENTOR.
Philip L. Epstein
BY
Morse, Altman & Oates
ATTORNEYS

Aug. 29, 1967                P. L. EPSTEIN                 3,339,193
                          TELEMETERING APPARATUS
Filed May 6, 1965                                      3 Sheets-Sheet 3

INVENTOR.
Philip L. Epstein
BY
Morse, Altman & Oates
ATTORNEYS

United States Patent Office 3,339,193
Patented Aug. 29, 1967

3,339,193
TELEMETERING APPARATUS
Philip L. Epstein, West Caldwell, N.J., assignor to Quindar Electronics, Inc., Springfield, N.J., a corporation of New Jersey
Filed May 6, 1965, Ser. No. 453,645
8 Claims. (Cl. 340—207)

The present invention relates to telemetering wherein the electrical output signal of a primary instrument transducer or the like is directed via a telemetering transmitter to a telemetering receiver which restores the original form of the input signal for display by an indicator or a recorder. In one such system, an analog voltage level is transduced to a representational frequency for transmission and the representational frequency is transduced to a functional related voltage level upon reception. Typically in such reception, this resulting voltage level is characterized by undesired jitter, i.e. fluctuation, which disturbs the accuracy of the resulting indication. The present invention contemplates a novel telemetering receiver characterized by jitter-free reception.

Primary objects of the present invention are: the provision of a novel telemetering receiver in which a representational frequency is transduced to a functionally related voltage level that is relatively jitter free; the provision of a telemetering receiver of the foregoing type comprising a so-called square loop frequency-to-voltage converter for translating a received representational frequency to a corresponding analog voltage, a source of reference voltage for comparison with this analog voltage and a voltage-to-current converter which receives the combined analog and reference voltages under feedback conditions that guarantee a relatively jitter-free output current; the provision of a telemetering receiver of the foregoing type in which the voltage-to-current converter is in association with a so-called three-zero filter; the provision of a telemetering receiver of the foregoing type in which the voltage-to-current converter includes a magnetic modulator and a synchronous demodulator; the provision of a telemetering receiver of the foregoing type in combination with a D'Arsonval output for annunciating the jitter-free analog current.

Other objects of the present invention will in part be obvious and will in part appear hereinafter.

The invention accordingly comprises the system, its components and their interrelationships which are exemplified in the disclosure hereof. For a fuller understanding of the nature and objects of the present invention, reference should be had to the following detailed description, taken in connection with the accompanying drawings, wherein.

Introduction

Generally, a telemetering receiver of the present invention is associated with a transmitter that is designed to accept an input analog signal in the form of a low voltage level, say ranging from 0 to 10 millivolts, from a thermocouple or other transducer. The transmitter converts the input analog voltage to a corresponding analog signal in the form of an analog frequency, say in the range of from 5 to 25 cycles per second. The transmitter applies the analog frequency as amplitude or frequency modulation to a suitable audio or radio frequency carrier. In this form, the signal may be transmitted for any distance without significant degradation. The receiver detects the carrier wave and regenerates the analog frequency. The receiver finally converts the analog frequency to an output analog signal in the form of a voltage or current level corresponding to the voltage level of the input analog signal. The output analog signal is applied to a suitable readout such as a D'Arsonval meter.

Figure 1:
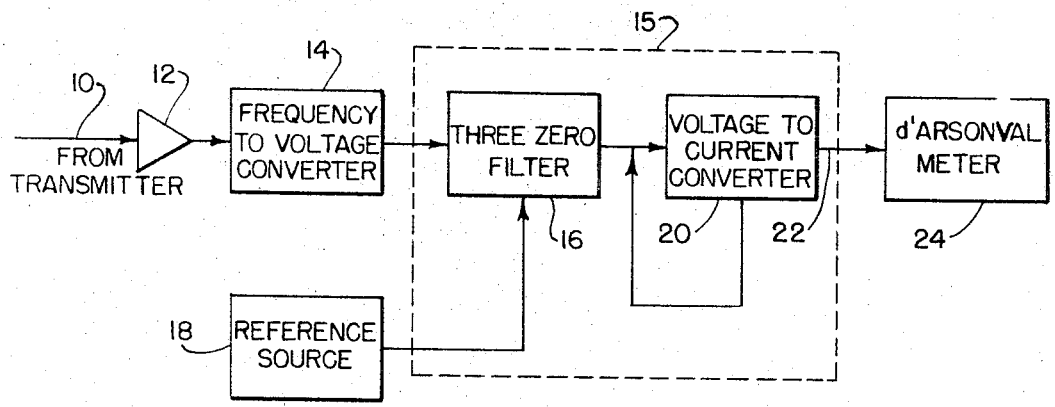
FIG. 1 is a block diagram of one form of telemetering receiver embodying the present invention.
Figure 2:
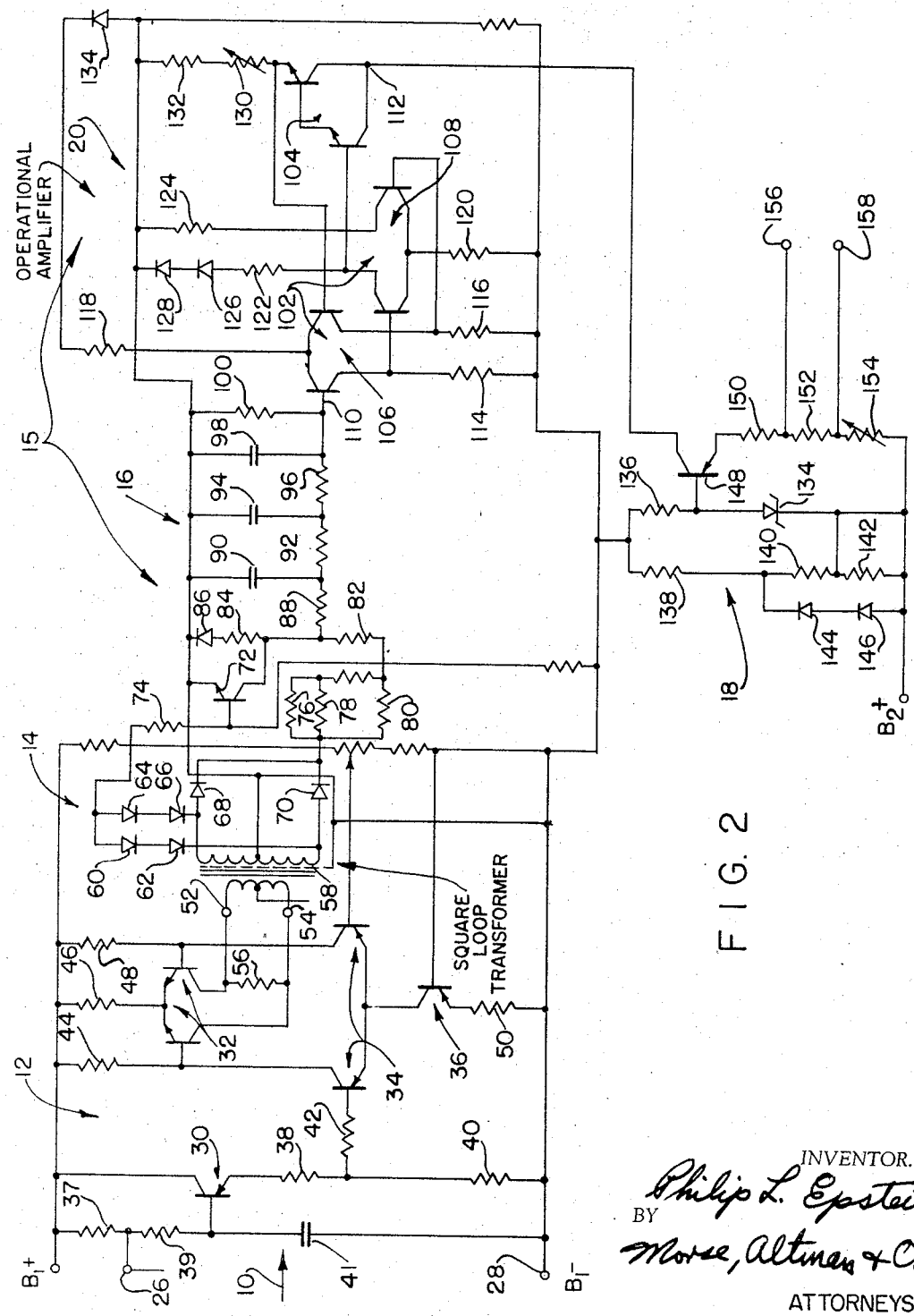
FIG. 2 is an electrical schematic of the telemetering receiver of FIG. 1.

The telemetering receiver of FIGS. 1 and 2

FIG. 1 discloses a telemetering receiver which receives a frequency modulated signal at 10 from an antenna or a line. This signal is amplified by a driver 12 for application to a frequency-to-voltage converter 14. Frequency-to-voltage converter 14 comprises a toroidally wound transformer, the core of which is composed of a coil of thin tape of any of several magnetic alloys having a "square" hysteresis loop. The core, by virtue of this property, has a sharply defined saturation flux density which is very largely unaffected by temperature and other environmental factors. The signal applied to the primary winding of this transformer is of sufficient magnitude to drive the core from positive to negative saturation or vice versa on each half of the analog frequency cycle. Each transition of the core from positive to negative saturation or vice versa results in a pulse of voltage at the transformer secondary, the time-voltage integral of which is independent of the driving voltage, the temperature and other environmental factors. The train of alternating pulses resulting at the secondary of the transformer is applied to a filtering and voltage-to-current converting network 15. Network 15 includes a three-zero filter 16 which, because of its location in the system, preserves the ability of the system to respond quickly to change but nevertheless to eliminate jitter in the system output. By virtue of its inherent characteristics, viz. its three stage resistor-capacitor nature (as can be mathematically demonstrated), three zero filter 16 avoids brute force techniques for eliminating jitter in the output. Network 15 includes also a voltage-to-current converter 20 which is in the form of an operational amplifier that isolates the current output at 22 from the aforementioned parts of the system. This output at 22 is applied to a D'Arsonval meter 24 to provide a jitter-free electromechanical indication for observation or control purposes.

As shown in FIG. 2 input signal 10 is applied across a pair of terminals 26, 28 to driver 12, which comprises a transistor pre-amplifier 30, two double transistor push-pull cascaded amplifiers 32 and 34, and a transistor current regulator 36. The signal is applied to preamplifier 30 through a resistor-capacitor coupling 37, 39, 41, the junction between resistor 39 and capacitor 41 being connected to the base of the transistor of pre-amplifier 30. The emitter of the transistor of pre-amplifier 30, which is biased by resistors 38, 40, is coupled by resistor 42 to the base of the first stage transistor of push-pull amplifier 34. The collectors of the first stage and second stage transistors of push-pull amplifier 34 are directly coupled, respectively, to the bases of the first stage and second stage transistors of push-pull amplifier 32. Push-pull amplifiers 32 and 34 are biased by resistors 44, 46 and 48. The emitters of the first stage and second stage transistors of push-pull amplifier 34 are controlled by current regulator 36, which includes a transistor having an emitter that is biased by a resistor 50 and a base that is stabilized. The output of push-pull amplifier 32 is developed at a pair of terminals 52, 54 across a resistor 56 which is connected between the collectors of the first stage and second stage transistors of push-pull amplifier 32.

The signal developed across terminals 52, 54 is applied to frequency-to-voltage converter 14 via the primary of a transformer 58 which is of the square loop type described above. The output of the secondary of transformer 58 is applied to filtering and voltage-to-current converter circuit 15. Circuit 15 is fed through rectifying diodes 60, 62, 64, 66, 68 and 70. The output is a square wave pulse train that is applied to a transistor switch 72 to be described below. The diodes are coupled to the base of transistor 72 through a resistor 74 and are coupled to the collector of transistor 72 through a resistor matrix 76, 78, 80 and 82. The output of transistor switch 72, which is developed across its collector and emitter, is coupled to three-zero filter 16 through a serially connected resistor 84 and diode 86. The operation of diodes 60, 62, 64, 66, 68 and 70 is that of a square loop, full wave rectifier, producing square wave pulses separated by intervals of time depending on the frequency of the input pulses. The output pulses are of the same height and width, their value depending upon their spacing. In other words, the average direct current depends upon the pulse repetition frequency.

Three-zero filter 16 includes a first resistor capacitor stage 88, 90, a second resistor-capacitor stage 92, 94, and a third resistor-capacitor stage 96, 98. The output of three-zero filter 16 is developed across a resistor 100. For the three-zero filter to operate properly, each capacitor 90, 94 and 98 must be capable of charging and discharging, in effect, in two directions, i.e., back to the source and into the next capacitor. If this were not so, as may be shown by mathematical analysis, the average direct current would not bear a linear relation to the pulse repetition frequency. Rectifying diodes 60, 62, 64, 68, 70 and 72 would prevent these capacitors from discharging back toward the source but switching transistor 72 operates as a gate to provide a discharge path that otherwise would be lacking. Switching transistor 72 is designed to conduct during the absence of an input pulse and to be non-conducting in the presence of an input pulse from square loop transformer 58.

Voltage-to-current converter 20 includes a differential amplifier 102 and a current regulator 104. Differential amplifier 102 includes two push-pull pairs of transistors which constitute an input amplifier 106 and a function generator 108. The input from three-zero filter 16 is applied to the base of the first stage of amplifier 106 as at 110. The output of amplifier 106, which is developed at the collectors of the first stage and second stage transistors, is applied respectively to the bases of the first stage and second stage transistors of function generator 108. The output of function generator 108, which is developed at the collector of its first stage transistor is applied to current regulator 104, which consists of a pair of cascaded transistors. The base of the first stage transistor of current regulator 104 is connected to the emitter of the first stage transistor of function generator 108. A feedback path from current regulator 104 to amplifier 106 is established from the emitter of the second stage transistor of current regulator 104 to the base of the second stage transistor of amplifier 106. The output of current regulator 104 and, therefore, the output of voltage-to-current converter 20 is developed at junction 112 between the collectors of the first stage and second stage transistors of current regulator 104. As will be apparent: biasing potentials for input amplifier 106 are established by resistors 114, 116 and 118; biasing potentials for function generator 108 are established by resistors 120, 122 and 124 and by diodes 126 and 128; and biasing potentials for current regulator 104 are established by resistors 130 and 132. The operation of first stage and second stage transistors of current regulator 104 is such that under the control of resistors 132, 130, the voltage fed back is equal to the voltage output of the filter across resistor 100. In effect, the arrangement constitutes two batteries of the same polarity with a fixed voltage and variable current output.

The voltage resulting at the output of current regulator 104 is combined with a reference current from reference circuit 18, which is controlled by a zener reference diode 134. The voltage across zener diode and the current therethrough is established by resistors 136, 138, 140 and 142 and by rectifying diodes 144 and 146. The output of zener diode 134 is applied to the base of a current regulating transistor 148. The collector of transistor 148 is connected to the collectors of the first stage and second stage transistors of current regulator 104. The emitter of transistor 148 is biased by resistors 150, 152 and 154. The final output is developed between terminals 156 and 158 for application to any suitable output indicator or control typically a D'Arsonval meter.

Figure 3:
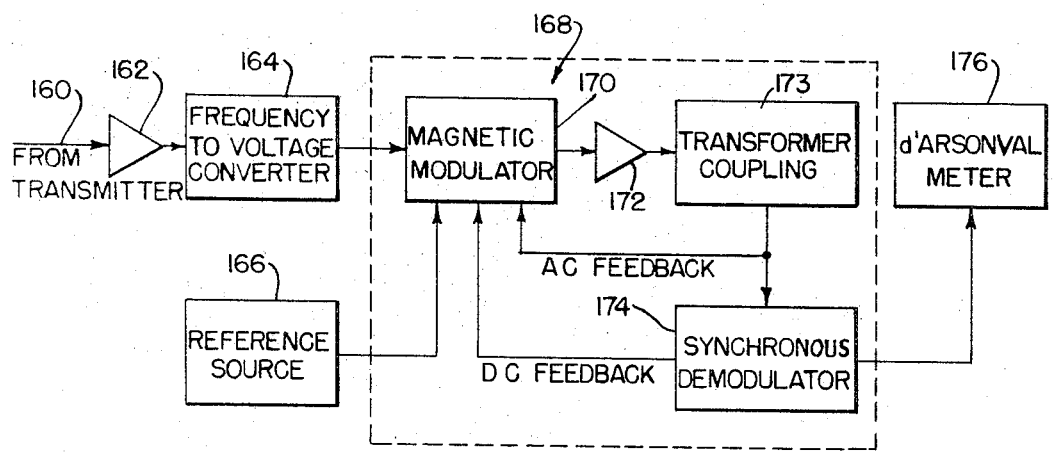
FIG. 3 is a block diagram of another form of telemetering receiver embodying the present invention.
Figure 4:
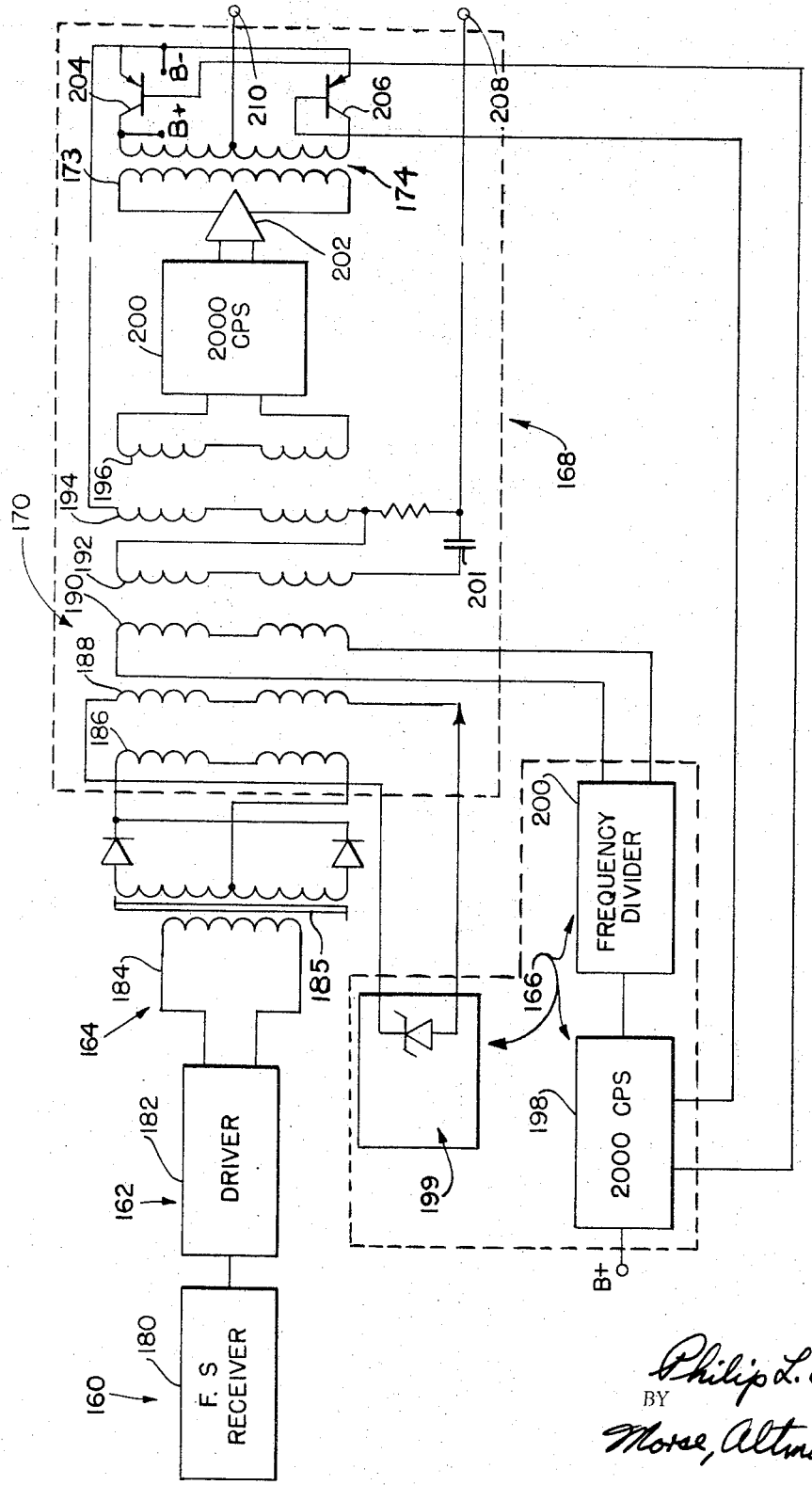
FIG. 4 is an electrical schematic of the telemetering receiver of FIG. 3.

*The telemetering receiver of FIGS. 3 and 4*

FIG. 3 discloses a telemetering receiver which receives a frequency modulated signal at 160. This signal is amplified by a driver 162 for application to a frequency-to-voltage converter 164, which comprises a toroidally wound transformer of the square hysteresis loop type described above in connection with frequency-to-voltage converter 14 of FIG. 1. The output of frequency-to-voltage converter 164 and the output of a reference signal generator 166 are applied to a filtering and voltage-to-current converting circuit 168. Filtering and voltage-to-current converting circuit 168 includes a second harmonic magnetic modulator 170, an alternating current amplifier 172, a transformer coupling 173, a synchronous demodulator 174, there being a feedback path from synchronous demodulator 174 to a magnetic modulator 170. The output direct current is applied to a D'Arsonval meter 176. The second harmonic magnetic modulator, typical in structure, includes primary and secondary transformer windings associated with square loop core material operated in the non-linear portion of its magnetic characteristic. This magnetic modulator serves as a mixer in that it comprises an excitation winding, two feedback windings and an output winding.

In FIG. 4, signal input 160 is shown at 180, driver 162 is shown at 182, frequency-to-voltage converter 164 is shown at 184 and reference source 166 is shown at 198, 199, 200, all analogous to their counterparts in FIG. 2. Filtering and voltage-to-current converting circuit 168 now will be described in terms of its components.

Magnetic modulator 170, which is energized through transformer coupling 185, includes six windings 186, 188, 190, 192, 194 aand 196. Winding 186 is the output from frequency-to-voltage converter 184. Winding 188 is a primary winding injecting the output of reference signal generator 166. Winding 190 is an excitation winding by which a signal from an oscillator 198 and a frequency divider 200 are applied to modulate the signal in the transformer with an audio frequency, for example, 1000 cycles per second. Windings 192 and 194 are primary windings by which feedback from the synchronous demodulator 174 is provided. Winding 196 is the secondary by which the output of magnetic modulator 170 is applied to a band pass filter 200, shown as passing 2000 cycles per second.

Amplifier 172 of FIG. 3 is shown at 202 for applying the output of frequency divider 200 to synchronous demodulator 174. As shown, synchronous demodulator 174 includes transformer 173 and a pair of transistors 204, 206 arranged in push-pull relation. The collectors of transistors 204, 206 are connected to the opposite terminals of the secondary of transformer 173. The emitters of transistors 204, 206 are applied to feedback winding 194. The bases of transistors 204, 206 are connected to oscillator 198 for synchronization. The resulting analog current developed across capacitor 201 is applied to a D'Arsonval meter 176 via output terminals 208, 210.

*Summary of operation and conclusion*

In operation of the telemetering receiver of FIGS. 1 and 2, signal 10 is applied to driver 12 which is directed to frequency-to-voltage converter 14. The outputs of frequency-to-voltage converter 14 and reference source 18 are applied to circuit 15, which includes a three-zero filter 16 and an operational amplifier 20. The filtering effect of the three-zero filter and the feedback effect of operational amplifier combine to produce a very stable output current which is an analog representation of the input. The various stages, as shown in FIG. 2, are powered as shown at $B_1+$, $B_2+$ and $B-$.

In operation of the telemetering receiver of FIGS. 3 and 4, a frequency modulated signal 180 is applied to driver 182 which is directed to a frequency-to-voltage converter 184. The outputs of frequency to voltage converter 184 and reference source 166 are applied to circuit 168, which includes a magnetic modulator 170, a tuned transformer coupling 173 and a synchronous demodulator 174. The filtering effect of the tuned transformer coupling 173 and feedback between synchronous demodulator 174 and magnetic modulator 170 combine to produce a very stable output current which is an analog representation of the input. The various stages, as shown in FIG. 4, are powered as shown at $B+$ and $B-$.

The present invention thus provides a novel technique for producing a jitter-free analog direct current output in a telemetering receiver.

Since certain changes may be made in the foregoing disclosure without departing from the scope of the invention herein involved, it is intended that all matter contained in the foregoing description and shown in the accompanying drawings shall be interpreted in an illustrative and not a limiting sense.

What is claimed is:

1. A telemetering receiver comprising means for amplifying a frequency modulated signal from a telemetering transmitter, a frequency-to-voltage converter including a square-loop transformer for producing a train of pulses of like height and width such that their corresponding direct current is a function of their pulse repetition frequency, source means for producing a reference voltage, filter means for receiving said train of pulses and said reference voltage in order to produce a composite voltage, and feedback means for converting said composite voltage to an an analog current.

2. The telemetering receiver of claim 1 wherein said filter means is a three-zero filter.

3. The telemetering receiver of claim 1 wherein said filter means is a tuned transformer coupling.

4. The telemetering receiver of claim 1 wherein a D'Arsonval meter is controlled by said analog current.

5. The telemetering receiver of claim 1 wherein said feedback means is an operational amplifier.

6. The telemetering receiver of claim 1 wherein said feedback means includes a magnetic modulator and a synchronous demodulator, said magnetic modulator driving said synchronous demodulator to produce said analog current, said synchronous demodulator applying a feedback signal to said magnetic modulator.

7. A telemetering receiver comprising means for amplifying a frequency modulated signal from a telemetering transmitter, a frequency-to-voltage converter including a square-loop transformer for producing a train of pulses of like height and width such that their corresponding direct current is a function of their pulse repetition frequency, source means for producing a reference voltage, filter means for receiving said train of pulses and said reference voltage in order to produce a composite voltage and feedback means for converting said composite voltage to an analog current, said filter means being a three-zero filter including three resistor-capacitor stages, said feedback means including an operational amplifier, said operational amplifier applying a feedback signal to the junction between said three-zero filter and said operational amplifier.

8. A telemetering receiver comprising means for amplifying a frequency modulated signal from a telemetering transmitter, a frequency-to-voltage converter including a square-loop transformer for producing a train of pulses of like height and width such that their corresponding direct current is a function of their pulse repetition frequency, source means for producing a reference voltage, filter means for receiving said train of pulses and said reference voltage in order to produce a composite voltage, and feedback means for converting said composite voltage to an analog current, said filter means being a tuned transformer coupling, said feedback means including a magnetic modulator which applies a signal to said tuned transformer coupling and a synchronous demodulator which receives a signal from said tuned transformer coupling, said synchronous demodulator applying a signal to said magnetic modulator.

No references cited.

NEIL C. READ, *Primary Examiner.*

THOMAS B. HABECKER, *Examiner.*